(12) United States Patent
Moore et al.

(10) Patent No.: US 12,461,845 B2
(45) Date of Patent: Nov. 4, 2025

(54) SYSTEM AND METHOD FOR DETECTING SOFTWARE TESTS THAT ARE SUSPECTED AS TESTS THAT ALWAYS PROVIDE FALSE POSITIVE

(71) Applicant: JPMorgan Chase Bank, N.A., New York, NY (US)

(72) Inventors: Devin C Moore, Columbus, OH (US); Justin Haas, West Chester, PA (US); Francine Jackson, New York, NY (US); Marco Scata, Bournemouth (GB); Matthew Andreas, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 271 days.

(21) Appl. No.: 18/196,478

(22) Filed: May 12, 2023

(65) Prior Publication Data

US 2024/0378141 A1 Nov. 14, 2024

(51) Int. Cl.
*G06F 9/44* (2018.01)
*G06F 11/3668* (2025.01)

(52) U.S. Cl.
CPC ........ *G06F 11/3692* (2013.01); *G06F 11/368* (2013.01)

(58) Field of Classification Search
None
See application file for complete search history.

(56) References Cited

U.S. PATENT DOCUMENTS

| | | | |
|---|---|---|---|
| 11,086,768 B1* | 8/2021 | Hicks | G06F 18/214 |
| 2003/0172053 A1* | 9/2003 | Fairweather | G06F 8/427 |
| 2008/0243969 A1* | 10/2008 | Wintergerst | G06F 11/3466 |
| 2014/0344267 A1* | 11/2014 | LeBert | G06F 16/972 |
| | | | 707/736 |

(Continued)

OTHER PUBLICATIONS

Carlos Schults, "How to Use Assert in JUnit With Examples", Mar. 2023, https://coderpad.io/blog/development/how-to-use-assert-in-junit-with-examples/ (Year: 2023).*

(Continued)

*Primary Examiner* — Bradley A Teets
*Assistant Examiner* — Lanny N Ung
(74) *Attorney, Agent, or Firm* — GREENBLUM & BERNSTEIN, P.L.C.

(57) ABSTRACT

Various methods, apparatuses/systems, and media for detecting fake software tests are disclosed. A processor detects changes in a code against a commit timeline and stores historical record of code change differences over time onto a database. An API call is made to obtain from the database, for only the changed files in a given pull request, a list of the change differences which comes as a structured object. The processor converts the structured object into a single string value containing all of the change differences; and searches the string for a set of disallowed commands for checking for assertions in the given pull request which is attempting only to change code with a fake test that always passes the code in connection with testing the application. When such a command is found, comments back to the given pull request indicating that the given pull request contains the fake test.

20 Claims, 14 Drawing Sheets

(56) References Cited

U.S. PATENT DOCUMENTS

| | | | | |
|---|---|---|---|---|
| 2015/0205600 A1* | 7/2015 | Grillo | ................... | G06F 16/148 |
| | | | | 717/101 |
| 2015/0293962 A1* | 10/2015 | van Oortmerssen | ... | G06F 16/22 |
| | | | | 707/756 |
| 2018/0052725 A1* | 2/2018 | Hannson | .................. | G06F 11/07 |
| 2020/0218533 A1* | 7/2020 | Sharma | ..................... | G06F 8/71 |
| 2021/0124799 A1* | 4/2021 | Gatter | ..................... | G06F 40/12 |

OTHER PUBLICATIONS

Cody Watson et al., "On Learning Meaningful Assert Statements for Unit Test Cases", 2020 (Year: 2020).*

* cited by examiner

SYSTEM AND METHOD FOR DETECTING SOFTWARE TESTS THAT ARE SUSPECTED AS TESTS THAT ALWAYS PROVIDE FALSE POSITIVE

TECHNICAL FIELD

This disclosure generally relates to software testing, and, more particularly, to methods and apparatuses for implementing a platform, language, cloud, and database agnostic fake tests detection module configured to detect software tests that are suspected as tests that always provide false positive.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

As software application becomes increasingly more complex, development, test, release, and management of such software application also become more complex as a large number of unique combinations of paths and modules may be tested, released, and managed for each software application. Software testing is a process of evaluating and verifying that a software product or application does what it is supposed to do. The benefits of testing include preventing bugs, reducing development costs, and improving performance. Conventional tools exist for software testing. For example, Jules may provide a CI/CD (Continuous Integration/Continuous Delivery) pipeline for application development and testing. Jenkins also offers a free and open source automation server, which may help automate parts of software development related to developing, testing, and deploying, facilitating continuous integration and continuous delivery.

However, these conventional tools fail to provide any configurations to identify or detect software tests, i.e., fake tests, that always provide a false positive result. For example, there might be some tests that may contain false evidence, i.e., tests that were designed to execute the code but did not test anything, and in particular tests that were forced into providing a false positive result. The conventional tools may implement an inefficient process that may perform full line by line recursive checks for deny list changes, but may fail to identify in particular alleged false test evidence. Existing methods such as mutation testing may not prove that there was an attempt to falsify the evidence. There may be software that may tell if a conditional is always true, but it checks across all source code regardless of any changes, with an attempt to prove that there is a conditional that is not needed. Testing every single file across all source code may prove to be extremely time consuming, costly, and inefficient.

Thus, there is a need for an advanced tool that can efficiently discover these fake tests if they exist.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic fake tests detection module configured to detect software tests that are suspected as tests (may also be referred to as fake tests) that always provide false positive and check for assertions in a pull request which is attempting only to change code with a new fake test, but the disclosure is not limited thereto.

According to exemplary embodiments, a method for detecting fake software tests in connection with an application by utilizing one or more processors along with allocated memory is disclosed. The method may include: detecting changes in a code against a commit timeline; storing onto a database, in response to detecting, historical record of code change differences over time, wherein the database stores only corresponding changed files including the changes that occurred between each commit and does not store a full version of the files; calling an application programming interface to obtain from the database, for only the changed files in a given pull request, a list of the change differences which comes as a structured object; converting the structured object into a single string value containing all of the change differences; searching the string for a set of disallowed commands for checking for assertions in the given pull request which is attempting only to change code with a fake test that always passes the code in connection with testing the application; and when such a command is found in response to searching, commenting back to the given pull request indicating that the given pull request contains the fake test.

According to exemplary embodiments, the method may further include: storing a result containing the fake test and indicating that the given pull request contains false test evidence; and transmitting the result to all approvers who approved the given pull request to implement corresponding remediation action.

According to exemplary embodiments, in searching the string for a set of disallowed commands, the method may further include: matching false patterns; and checking the entire string for each of the matching false patterns.

According to exemplary embodiments, the false patterns may include one or more of the following commands: AssertTrue(true) and AssertEquals(1,1), but the disclosure is not limited thereto.

According to exemplary embodiments, the false patterns may include tests that always pass, including regular expression matching.

According to exemplary embodiments, after converting the structured object into a single string value containing all of the change differences, the method may further include: obtaining matching groups between test annotations; and determining whether any true patterns are found between the test annotations.

According to exemplary embodiments, when it is determined that some true patterns are found between the test annotations, the method may further include: parsing the true patterns for corresponding comparisons that are being made; parsing a line of a test where variables that are being asserted are returned from a method call; and persisting and outputting a comparison list and maintaining counts per method call.

According to exemplary embodiments, when it is determined that no true patterns are found between the test annotations, the method may further include: persisting and outputting no test assertions found for given test annotations.

According to exemplary embodiments, the true patterns may include one or more of the following commands: AssertTrue(true) and AssertEquals(1,1), but the disclosure is not limited thereto.

According to exemplary embodiments, the true patterns may include tests that always pass, including regular expression matching.

According to exemplary embodiments, a system for detecting fake software tests in connection with an application is disclosed. The system may include: a processor; and a memory operatively connected to the processor via a communication interface, the memory storing computer readable instructions, when executed, may cause the processor to: detect changes in a code against a commit timeline; store onto a database, in response to detecting, historical record of code change differences over time, wherein the database stores only corresponding changed files including the changes that occurred between each commit and does not store a full version of the files; call an application programming interface to obtain from the database, for only the changed files in a given pull request, a list of the change differences which comes as a structured object; convert the structured object into a single string value containing all of the change differences; search the string for a set of disallowed commands for checking for assertions in the given pull request which is attempting only to change code with a fake test that always passes the code in connection with testing the application; and when such a command is found in response to searching, comment back to the given pull request indicating that the given pull request contains the fake test.

According to exemplary embodiments, the processor may be further configured to: store a result containing the fake test and indicating that the given pull request contains false test evidence; and transmit the result to all approvers who approved the given pull request to implement corresponding remediation action.

According to exemplary embodiments, in searching the string for a set of disallowed commands, the processor may be further configured to: match false patterns; and check the entire string for each of the matching false patterns.

According to exemplary embodiments, after converting the structured object into a single string value containing all of the change differences, the processor may be further configured to: obtain matching groups between test annotations; and determine whether any true patterns are found between the test annotations.

According to exemplary embodiments, when it is determined that some true patterns are found between the test annotations, the processor may be further configured to: parse the true patterns for corresponding comparisons that are being made; parse a line of a test where variables that are being asserted are returned from a method call; and persist and output a comparison list and maintaining counts per method call.

According to exemplary embodiments, when it is determined that no true patterns are found between the test annotations, the processor may be further configured to: persist and output no test assertions found for given test annotations.

According to exemplary embodiments, a non-transitory computer readable medium configured to store instructions for detecting fake software tests in connection with an application is disclosed. The instructions, when executed, may cause a processor to perform the following: detecting changes in a code against a commit timeline; storing onto a database, in response to detecting, historical record of code change differences over time, wherein the database stores only corresponding changed files including the changes that occurred between each commit and does not store a full version of the files; calling an application programming interface to obtain from the database, for only the changed files in a given pull request, a list of the change differences which comes as a structured object; converting the structured object into a single string value containing all of the change differences; searching the string for a set of disallowed commands for checking for assertions in the given pull request which is attempting only to change code with a fake test that always passes the code in connection with testing the application; and when such a command is found in response to searching, commenting back to the given pull request indicating that the given pull request contains the fake test.

According to exemplary embodiments, the instructions, when executed, may cause the processor to further perform the following: storing a result containing the fake test and indicating that the given pull request contains false test evidence; and transmitting the result to all approvers who approved the given pull request to implement corresponding remediation action.

According to exemplary embodiments, in searching the string for a set of disallowed commands, the instructions, when executed, may cause the processor to further perform the following: matching false patterns; and checking the entire string for each of the matching false patterns.

According to exemplary embodiments, after converting the structured object into a single string value containing all of the change differences, the instructions, when executed, may cause the processor to further perform the following: obtaining matching groups between test annotations; and determining whether any true patterns are found between the test annotations.

According to exemplary embodiments, when it is determined that some true patterns are found between the test annotations, the instructions, when executed, may cause the processor to further perform the following: parsing the true patterns for corresponding comparisons that are being made; parsing a line of a test where variables that are being asserted are returned from a method call; and persisting and outputting a comparison list and maintaining counts per method call.

According to exemplary embodiments, when it is determined that no true patterns are found between the test annotations, the instructions, when executed, may cause the processor to further perform the following: persisting and outputting no test assertions found for given test annotations.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
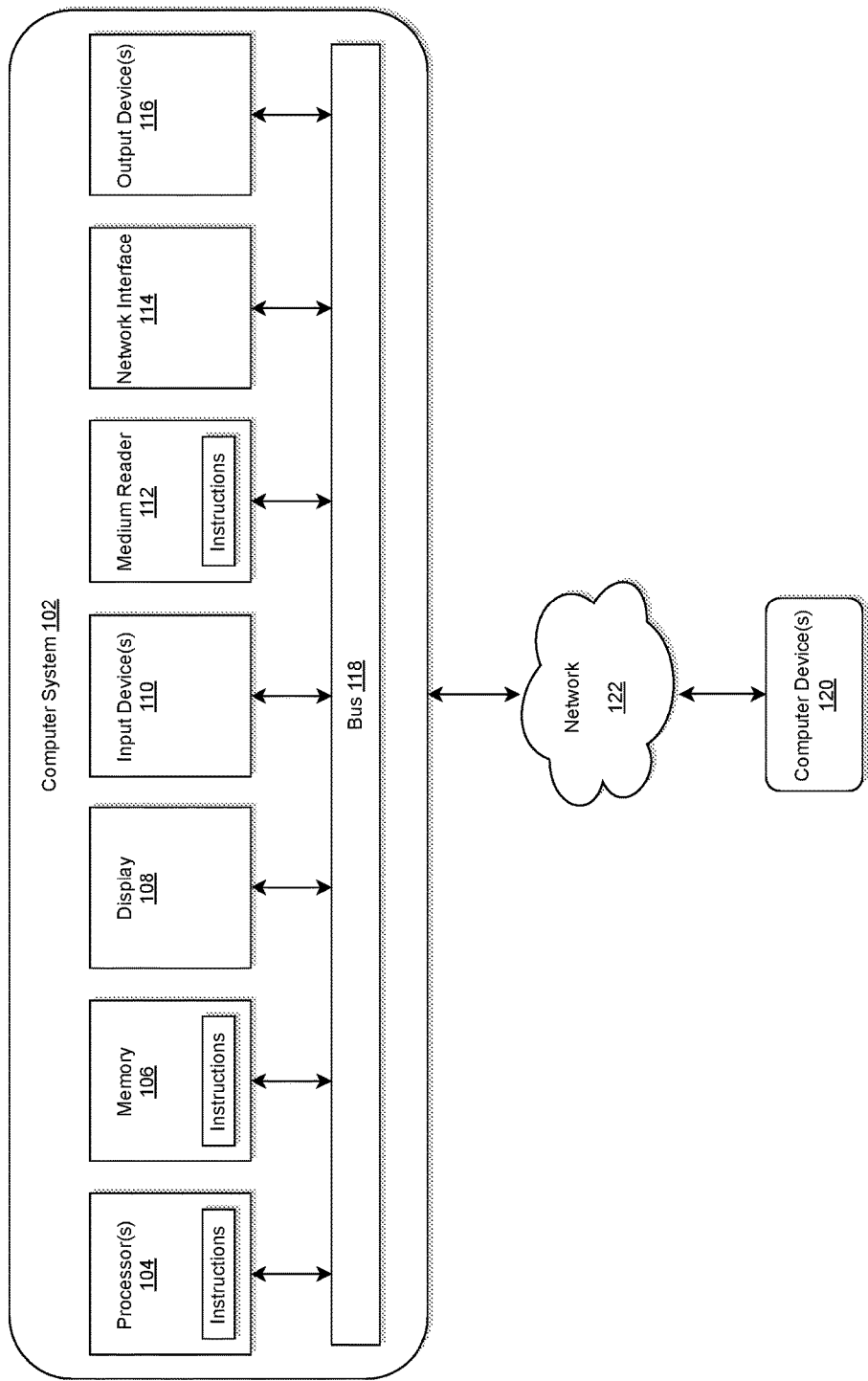
FIG. 1 illustrates a computer system for implementing a platform, language, database, and cloud agnostic fake tests detection module configured to automatically detect software tests that are suspected as tests that always provide false positive in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic fake tests detection module configured to automatically and dynamically detect software tests that are suspected as tests (may also be referred to as fake tests) that always provide false positive and check for assertions in a pull request which is attempting only to change code with a new fake test in accordance with an exemplary embodiment. The system 100 is generally shown and may include a computer system 102, which is generally indicated. Automatic and dynamic natures of the instant disclosures are implemented by the FIGS. 1-14 as described below.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the fake tests detection module may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the fake tests detection module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
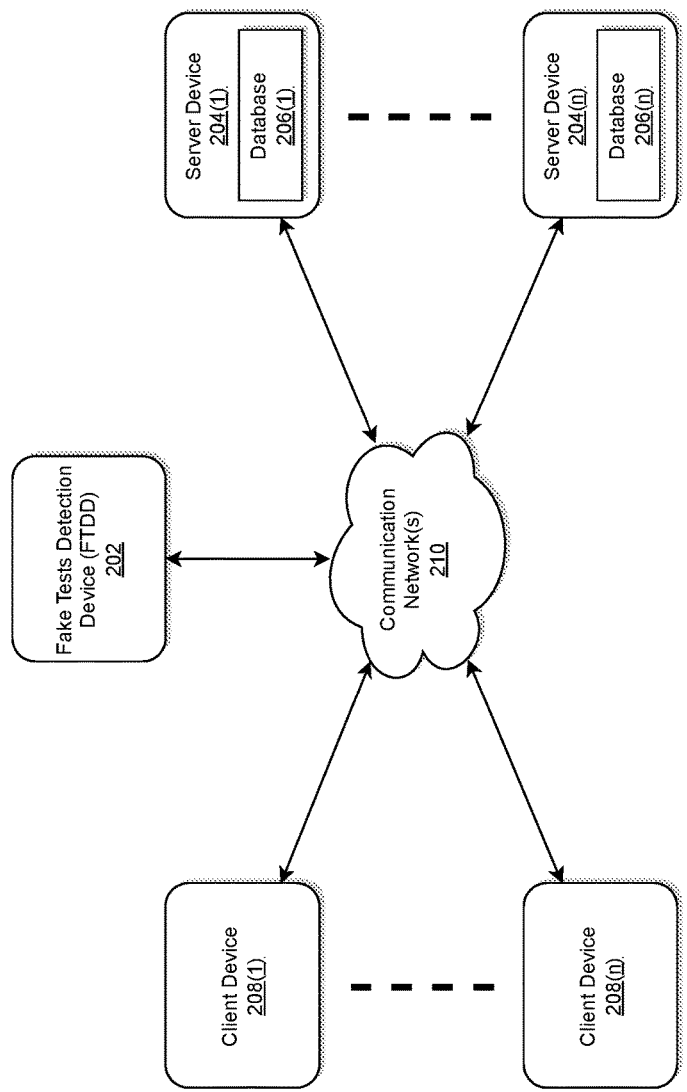
FIG. 2 illustrates an exemplary diagram of a network environment with a platform, language, database, and cloud agnostic fake tests detection device in accordance with an exemplary embodiment.

Referring to FIG. 2, a schematic of an exemplary network environment 200 for implementing a language, platform, database, and cloud agnostic fake tests detection device (FTDD) of the instant disclosure is illustrated.

According to exemplary embodiments, the above-described problems associated with conventional tools may be overcome by implementing an FTDD 202 as illustrated in FIG. 2 that may be configured for implementing a platform, language, database, and cloud agnostic fake tests detection module configured to automatically and dynamically detect software tests that are suspected as tests (may also be referred to as fake tests) that always provide false positive and check for assertions in a pull request which is attempting only to change code with a new fake test, but the disclosure is not limited thereto.

The FTDD 202 may be the same or similar to the computer system 102 as described with respect to FIG. 1.

The FTDD 202 may store one or more applications that can include executable instructions that, when executed by the FTDD 202, cause the FTDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the FTDD 202 itself, may be located in virtual server(s) running in a cloud-based computing environment rather than being tied to one or more specific physical network computing devices. Also, the application(s) may be running in one or more virtual machines (VMs) executing on the FTDD 202. Additionally, in one or more embodiments of this technology, virtual machine(s) running on the FTDD 202 may be managed or supervised by a hypervisor.

In the network environment 200 of FIG. 2, the FTDD 202 is coupled to a plurality of server devices 204(1)-204(n) that hosts a plurality of databases 206(1)-206(n), and also to a plurality of client devices 208(1)-208(n) via communication network(s) 210. A communication interface of the FTDD 202, such as the network interface 114 of the computer system 102 of FIG. 1, operatively couples and communicates between the FTDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FTDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FTDD 202 may be a standalone device or integrated with one or more other devices or apparatuses, such as one or more of the server devices 204(1)-204(n), for example. In one particular example, the FTDD 202 may be hosted by one of the server devices 204(1)-204(n), and other arrangements are also possible. Moreover, one or more of the devices of the FTDD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FTDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the FTDD 202 that may efficiently provide a platform for implementing a platform, language, database, and cloud agnostic fake tests detection module configured to automatically and dynamically detect software tests that are suspected as tests (may also be referred to as fake tests) that always provide false positive and check for assertions in a pull request which is attempting only to change code with a new fake test, but the disclosure is not limited thereto.

The client devices 208(1)-208(n) may run interface applications, such as standard web browsers or standalone client applications, which may provide an interface to communicate with the FTDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the FTDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the FTDD 202, the server devices 204(1)-204(n), or the client devices 208(1)-208(n), for example, may be configured to operate as virtual instances on the same physical machine. For example, one or more of the FTDD 202, the server devices 204(1)-204(n), or the client devices 208(1)-208(n) may operate on the same physical device rather than as separate devices communicating through communication network(s) 210. Additionally, there may be more or fewer FTDDs 202, server devices 204(1)-204(n), or client devices 208(1)-208(n) than illustrated in FIG. 2. According to exemplary embodiments, the FTDD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
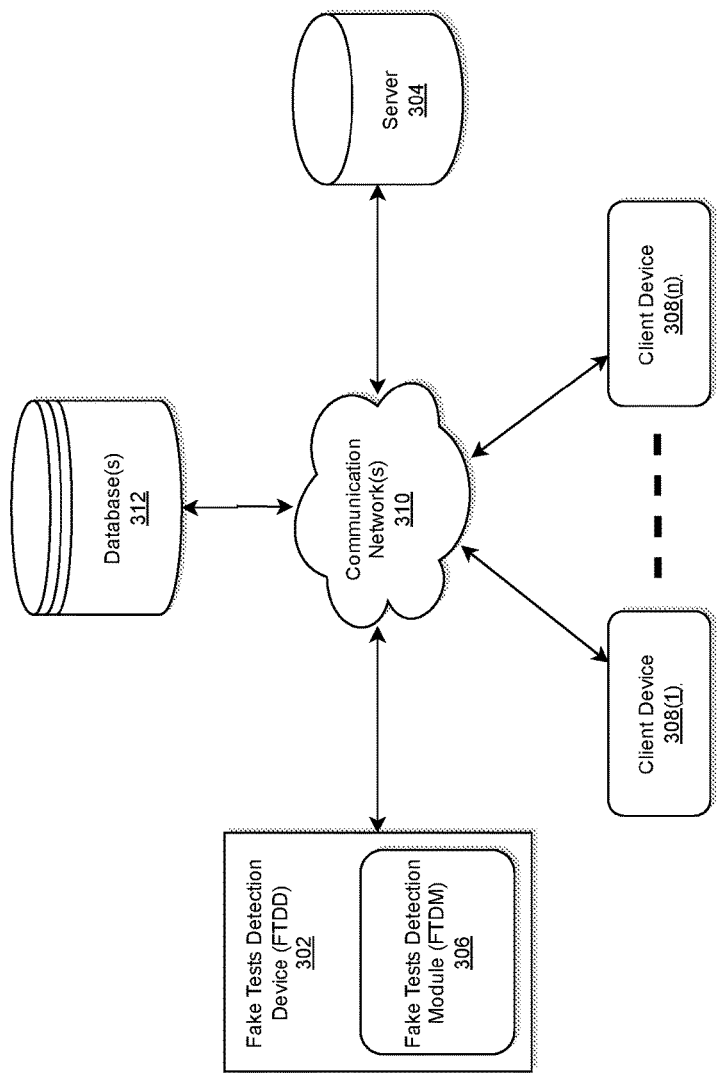
FIG. 3 illustrates a system diagram for implementing a platform, language, database, and cloud agnostic fake tests detection device having a platform, language, database, and cloud agnostic fake tests detection module in accordance with an exemplary embodiment.

FIG. 3 illustrates a system diagram for implementing a platform, language, and cloud agnostic FTDD having a platform, language, database, and cloud agnostic fake tests detection module (FTDM) in accordance with an exemplary embodiment.

As illustrated in FIG. 3, the system 300 may include an FTDD 302 within which an FTDM 306 is embedded, a server 304, a database(s) 312, a plurality of client devices 308(1) . . . 308(n), and a communication network 310.

According to exemplary embodiments, the FTDD 302 including the FTDM 306 may be connected to the server 304, and the database(s) 312 via the communication network 310. The FTDD 302 may also be connected to the plurality of client devices 308(1) . . . 308(n) via the communication network 310, but the disclosure is not limited thereto.

According to exemplary embodiment, the FTDD 302 is described and shown in FIG. 3 as including the FTDM 306, although it may include other rules, policies, modules, databases, or applications, for example. According to exemplary embodiments, the database(s) 312 may be configured to store ready to use modules written for each Application Programming Interface (API) for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the FTDM 306 may be configured to receive real-time feed of data from the plurality of client devices 308(1) . . . 308(n) and secondary sources via the communication network 310.

As may be described below, the FTDM 306 may be configured to: detect changes in a code against a commit timeline; store onto a database, in response to detecting, historical record of code change differences over time, wherein the database stores only corresponding changed files including the changes that occurred between each commit and does not store a full version of the files; call an application programming interface to obtain from the database, for only the changed files in a given pull request, a list of the change differences which comes as a structured object; convert the structured object into a single string value containing all of the change differences; search the string for a set of disallowed commands for checking for assertions in the given pull request which is attempting only to change code with a fake test that always passes the code in connection with testing the application; and when such a command is found in response to searching, comment back to the given pull request indicating that the given pull request contains the fake test, but the disclosure is not limited thereto.

The plurality of client devices 308(1) . . . 308(n) are illustrated as being in communication with the FTDD 302. In this regard, the plurality of client devices 308(1) . . . 308(n) may be "clients" (e.g., customers) of the FTDD 302 and are described herein as such. Nevertheless, it is to be known and understood that the plurality of client devices 308(1) . . . 308(n) need not necessarily be "clients" of the FTDD 302, or any entity described in association therewith herein. Any additional or alternative relationship may exist between either or both of the plurality of client devices 308(1) . . . 308(n) and the FTDD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via communication network 310, which may comprise plural networks as described above. For example, in an exemplary embodiment, one or more of the plurality of client devices 308(1) . . . 308(n) may communicate with the FTDD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The FTDD 302 may be the same or similar to the FTDD 202 as described with respect to FIG. 2, including any features or combination of features described with respect thereto.

Figure 4:
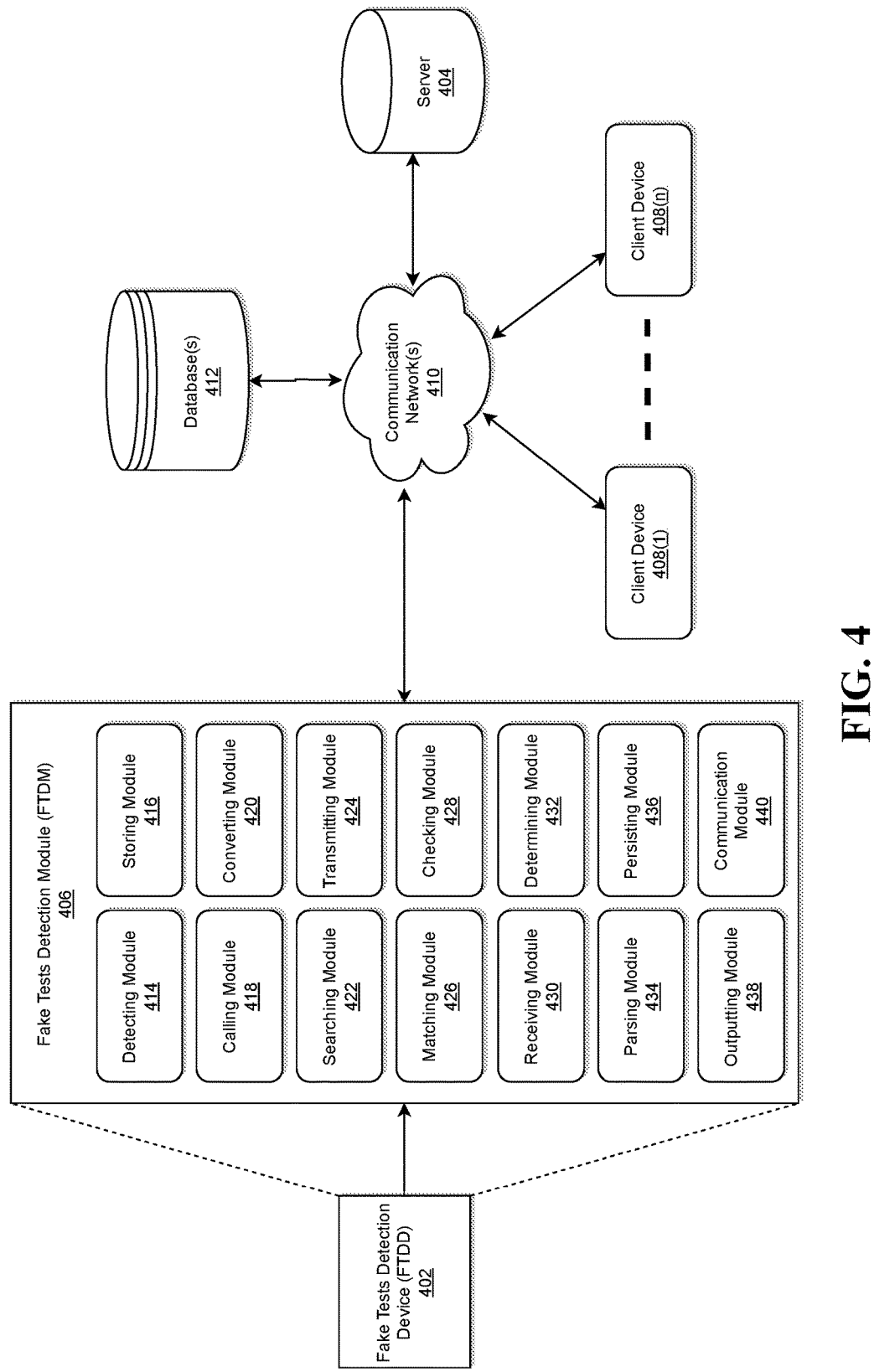
FIG. 4 illustrates a system diagram for implementing a platform, language, database, and cloud agnostic fake tests detection module of FIG. 3 in accordance with an exemplary embodiment.

FIG. 4 illustrates a system diagram for implementing a platform, language, database, and cloud agnostic FTDM of FIG. 3 in accordance with an exemplary embodiment.

According to exemplary embodiments, the system 400 may include a platform, language, database, and cloud agnostic FTDD 402 within which a platform, language, database, and cloud agnostic FTDM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the FTDD 402 including the FTDM 406 may be connected to the server 404 and the database(s) 412 via the communication network 410. The FTDD 402 may also be connected to the plurality of client devices 408(1)-408(n) via the communication network 410, but the disclosure is not limited thereto. The FTDM 406, the server 404, the plurality of client devices 408(1)-408(n), the database(s) 412, the communication network 410 as illustrated in FIG. 4 may be the same or similar to the FTDM 306, the server 304, the plurality of client devices 308(1)-308(n), the database(s) 312, the communication network 310, respectively, as illustrated in FIG. 3.

According to exemplary embodiments, as illustrated in FIG. 4, the FTDM 406 may include a detecting module 414, a storing module 416, a calling module 418, a converting module 420, a searching module 422, a transmitting module 424, a matching module 426, a checking module 428, a receiving module 430, a determining module 432, a parsing module 434, a persisting module 436, an outputting module 438, and a communication module 440. According to exemplary embodiments, interactions and data exchange among these modules included in the FTDM 406 provide the advantageous effects of the disclosed invention. Functionalities of each module of FIG. 4 may be described in detail below with reference to FIGS. 4-14.

According to exemplary embodiments, each of the detecting module 414, storing module 416, calling module 418, converting module 420, searching module 422, transmitting module 424, matching module 426, checking module 428, receiving module 430, determining module 432, parsing module 434, persisting module 436, outputting module 438, and the communication module 440 of the FTDM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the detecting module 414, storing module 416, calling module 418, converting module 420, searching module 422, transmitting module 424, matching module 426, checking module 428, receiving module 430, determining module 432, parsing module 434, persisting module 436, outputting module 438, and the communication module 440 of the FTDM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the detecting module 414, storing module 416, calling module 418, converting module 420, searching module 422, transmitting module 424, matching module 426, checking module 428, receiving module 430, determining module 432, parsing module 434, persisting module 436, outputting module 438, and the communication module 440 of the FTDM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the detecting module 414, storing module 416, calling module 418, converting module 420, searching module 422, transmitting module 424, matching module 426, checking module 428, receiving module 430, determining module 432, parsing module 434, persisting module 436, outputting module 438, and the communication module 440 of the FTDM 406 of FIG. 4 may be called via corresponding API.

According to exemplary embodiments, the process implemented by the FTDM 406 may be executed via the communication module 440 and the communication network 410, which may comprise plural networks as described above. For example, in an exemplary embodiment, the various components of the FTDM 406 may communicate with the server 404, and the database(s) 412 via the communication module 440 and the communication network 410 and the results may be displayed onto a graphical user interface embedded within the FTDM 406 or within the client device 408(1)-408(n). Of course, these embodiments are merely exemplary and are not limiting or exhaustive. The database(s) 412 may include the databases included within the private cloud and/or public cloud and the server 404 may include one or more servers within the private cloud and the public cloud.

According to exemplary embodiments, the detecting module 414 may be configured to detect changes in a code against a commit timeline. The storing module 416 may be configured to store onto the database 412, in response to detecting, historical record of code change differences over time. The database 412 stores only corresponding changed files including the changes that occurred between each commit and does not store a full version of the files.

According to exemplary embodiments, the calling module 418 may be configured to call an application programming interface to obtain from the database 412, for only the changed files in a given pull request, a list of the change differences which comes as a structured object. The converting module may be configured to convert the structured object into a single string value containing all of the change differences.

According to exemplary embodiments, the searching module 422 may be configured to search the string for a set of disallowed commands for checking for assertions in the given pull request which is attempting only to change code with a fake test that always passes the code in connection with testing the application. When such a command is found in response to searching by searching module 422, comment is sent back to the given pull request by the transmitting module 424 indicating that the given pull request contains the fake test.

According to exemplary embodiments, the storing module 416 may be further configured to store a result containing the fake test and indicating that the given pull request contains false test evidence; and the transmitting module 424 may be configured to transmit the result to all approvers who approved the given pull request to implement corresponding remediation action.

According to exemplary embodiments, in searching the string for a set of disallowed commands, the matching module 426 may be configured to match false patterns; and the checking module 428 may be configured to check the entire string for each of the matching false patterns.

According to exemplary embodiments, the false patterns may include one or more of the following commands: AssertTrue(true) and AssertEquals(1,1), but the disclosure is not limited thereto.

According to exemplary embodiments, the false patterns may include tests that always pass, including regular expression matching.

According to exemplary embodiments, after converting the structured object into a single string value containing all of the change differences, the receiving module 430 may be configured to obtain matching groups between test annotations; and the determining module 432 may be configured to determine whether any true patterns are found between the test annotations.

According to exemplary embodiments, when it is determined that some true patterns are found between the test annotations, the parsing module 434 may be configured to parse the true patterns for corresponding comparisons that are being made; and parse a line of a test where variables that are being asserted are returned from a method call. The persisting module 436 may be configured to persist the true patterns and the parsed line and the outputting module 438 may be configured to output a comparison list and maintain counts per method call.

According to exemplary embodiments, when it is determined that no true patterns are found between the test annotations, the persisting module 436 may be further configured to persist and the outputting module 438 may be further configured to output no test assertions found for given test annotations.

According to exemplary embodiments, the true patterns may include one or more of the following commands: AssertTrue(true) and AssertEquals(1,1), but the disclosure is not limited thereto.

According to exemplary embodiments, the true patterns may include tests that always pass, including regular expression matching.

Figure 5:
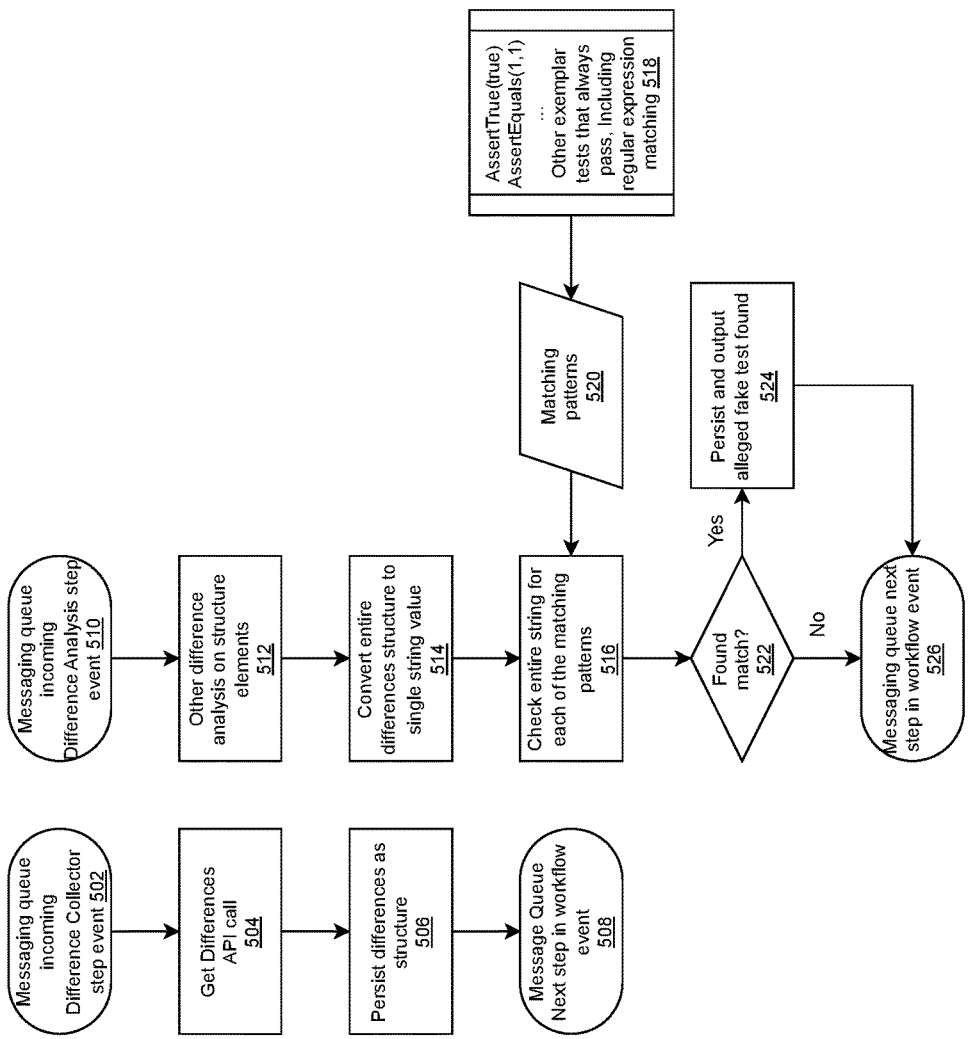
FIG. 5 illustrates an exemplary flow chart of a process of detecting fake tests as implemented by the platform, language, database, and cloud agnostic fake tests detection module of FIG. 4 in accordance with an exemplary embodiment.

FIG. 5 illustrates an exemplary flow chart of a process 500 of detecting fake tests as implemented by the platform, language, database, and cloud agnostic FTDM 406 of FIG. 4 in accordance with an exemplary embodiment. It may be appreciated that the illustrated process 500 and associated steps may be performed in a different order, with illustrated steps omitted, with additional steps added, or with a combination of reordered, combined, omitted, or additional steps.

As illustrated in the process 500 of FIG. 5, according to exemplary embodiments, step 502 corresponds to messaging queue incoming difference collector step event. At step 504, a get difference API call is made. In response to the API call, at step 506, differences are persisted as structure. At step 508, the process 500 moves to a message queue next step in a workflow event.

According to exemplary embodiments, step 510 corresponds to a messaging queue incoming difference analysis step event. Step 512 corresponds to other difference analysis on structure elements. At step 514, the entire differences structure is converted into a single string value. At step 516, the process 500 checks the entire string for each of the matching patterns. At step 516, the process also receives matching patterns 520 by calling a method 518 that may include AssertTrue(true); AssertEquals(1,1); and other exemplar tests that always pass, including regular expression matching. At step 522, the process 500 checks whether any match is found. When a match is found, at step 524, the process 500 persists and outputs alleged fake test found.

When a match is not found, at step 526, the process 500 moves to messaging queue next step in the workflow event.

Figure 6:
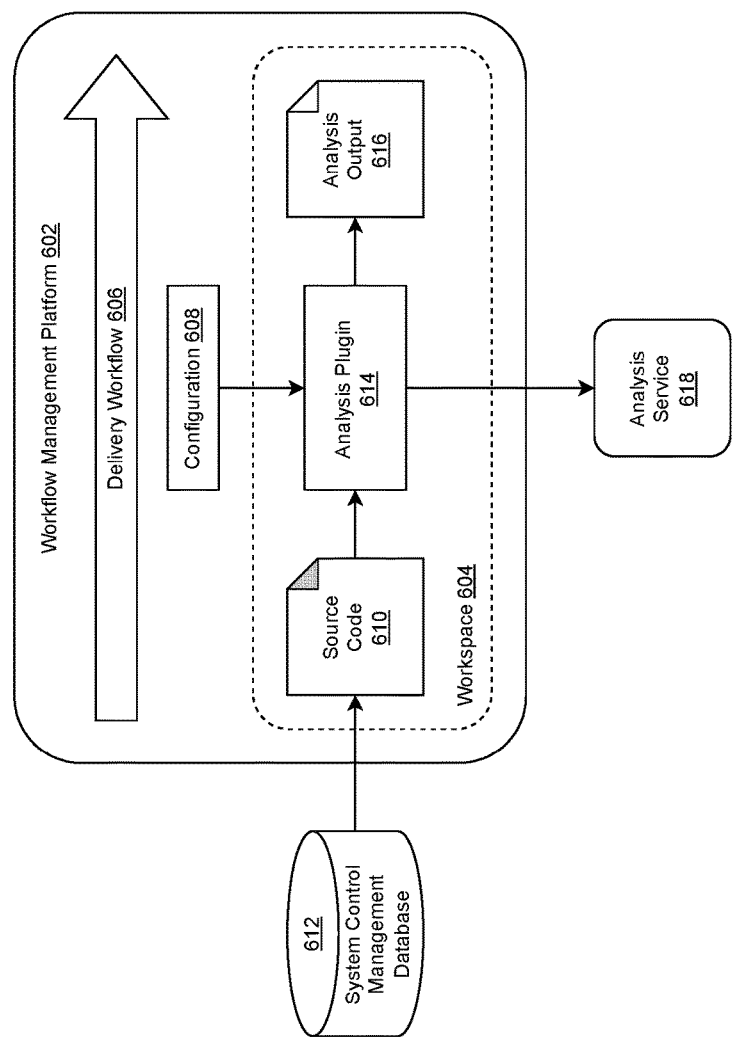
FIG. 6 illustrates an exemplary architecture of automated plugin as implemented by the platform, language, database, and cloud agnostic fake tests detection module of FIG. 4 in accordance with an exemplary embodiment.

FIG. 6 illustrates an exemplary architecture 600 of automated plugin as implemented by the platform, language, database, and cloud agnostic FTDM 406 of FIG. 4 in accordance with an exemplary embodiment.

As illustrated in FIG. 6, the exemplary architecture 600 may implement a workflow management platform 602 that may include a delivery workflow 606, a configuration 608, and a workspace 604. The workspace 604 may include a source code 610 received from a system control management database 612, an analysis plugin 614 that outputs results to an analysis output 616 and an analysis service 618 based on the source code 610 and the configuration 608.

Figure 7:
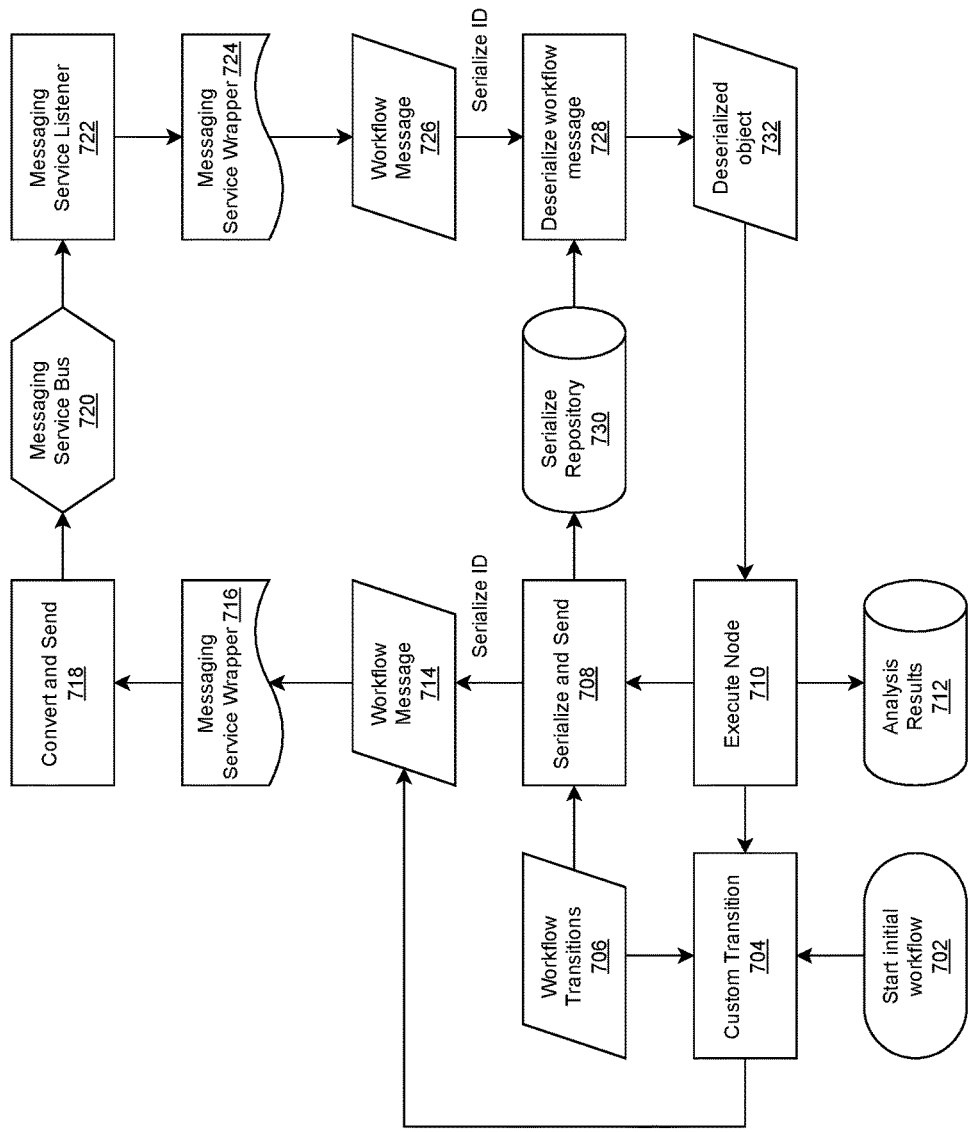
FIG. 7 illustrates an exemplary flow chart of a process of messaging harness as implemented by the platform, language, database, and cloud agnostic fake tests detection module of FIG. 4 in accordance with an exemplary embodiment.

FIG. 7 illustrates an exemplary flow chart of a process 700 of messaging harness as implemented by the platform, language, database, and cloud agnostic FTDM 406 of FIG. 4 in accordance with an exemplary embodiment. It may be appreciated that the illustrated process 700 and associated steps may be performed in a different order, with illustrated steps omitted, with additional steps added, or with a combination of reordered, combined, omitted, or additional steps.

As illustrated in the process 700 of FIG. 7, at step 702, an initial workflow is started; at step 704, custom transition is performed based on workflow transitions 706 and a node is executed at step 710. Outputs from step 704 (custom transition is input to a workflow message 714. At step 708, the process 700 receives, as input, data from the workflow transitions 706 and data from the executed node at step 710, and serializes and sends data (i.e., serialize ID) to the workflow message 714 and to the serialize repository 730. At step 716, the messaging and service wrapper receives output data from the workflow message 714. At step 718, the process 700 converts the output data from the messaging and service wrapper and sends the data, as input, to the messaging service bus 720. At step 722, output data from the messaging service bus 720 is received by a messaging service listener. At step 724, the messaging service wrapper receives output data from the messaging service listener. At step 726, the workflow message 726 receives the data from the messaging service wrapper as input and outputs the serialize ID to the deserialize workflow message 728 which also receives data from the serialize repository 730. At step 732, the process 700 receives the deserialized object that is being output from the deserialize workflow message 728. The deserialized object is being utilized to execute the node at step 710 and the results are stored in a database at step 712.

Figure 8:
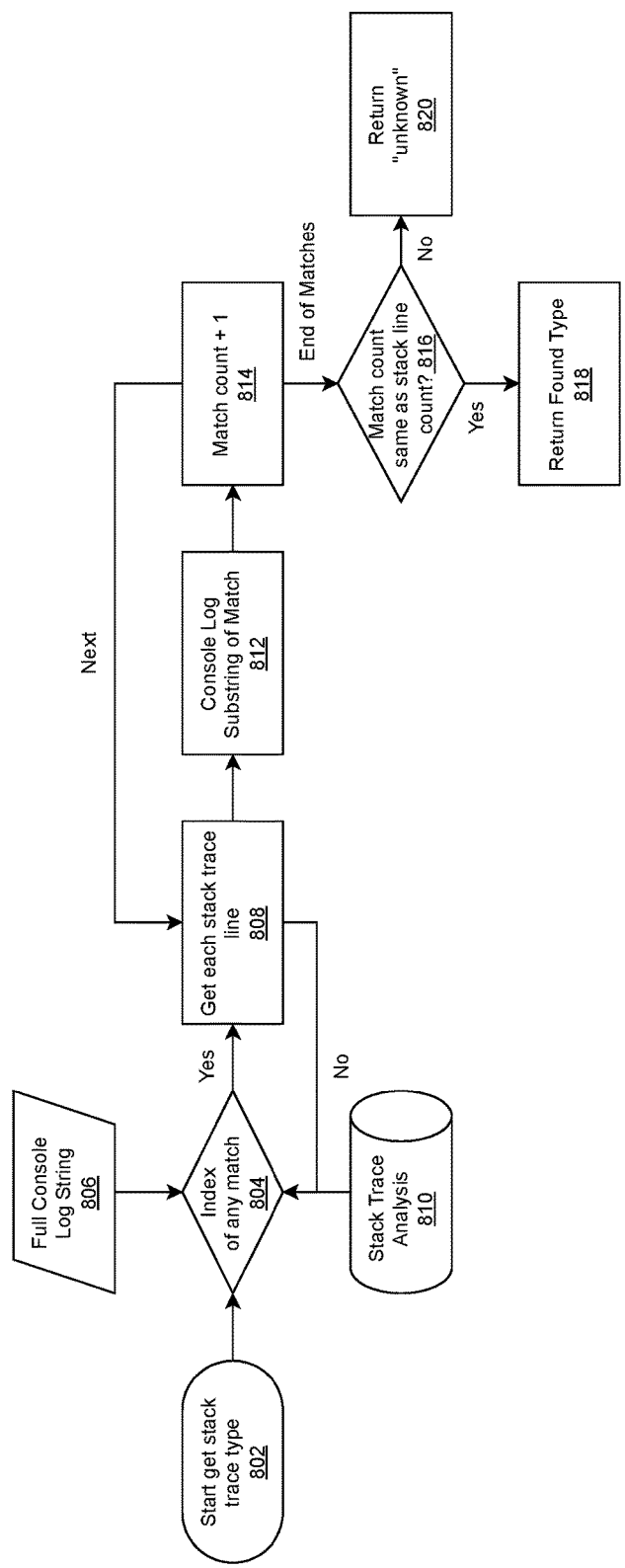
FIG. 8 illustrates an exemplary flow chart of a process of determining whether match count is the same as stack line count as implemented by the platform, language, database, and cloud agnostic fake tests detection module of FIG. 4 in accordance with an exemplary embodiment.

FIG. 8 illustrates an exemplary flow chart of a process 800 of determining whether match count is the same as stack line count as implemented by the platform, language, database, and cloud agnostic FTDM 406 of FIG. 4 in accordance with an exemplary embodiment. It may be appreciated that the illustrated process 800 and associated steps may be performed in a different order, with illustrated steps omitted, with additional steps added, or with a combination of reordered, combined, omitted, or additional steps.

As illustrated in the process 800 of FIG. 8, at step 802, a process to get stack trace type is initiated. At step 804, the process 800 checks whether there is index of any match based on analyzing a full console log string 606 and track trace analysis data 810 received from a database. When it is determined at step 804, that there is an index of a match, at step 808, the process 800 gets each stack trace line. When it is determined at step 804 that there is no index of a match, the process 800 continues to look for matches. At step 812, the process 800 consoles log substring of match. At step 814, the process 800 initiates a "match count+1" process for obtaining next match and ends the matching process. At step 816, the process 800 determines whether the match count resulting at step 814 is the same as the stack line count. At step 818, the process 800 returns "found type" when it is determined at step 816 that the match count resulting at step 814 is the same as the stack line count. At step 820, the process 800 returns "unknown" when it is determined at step 816 that the match count resulting at step 814 is not the same as the stack line count and the process 800 ends.

Figure 9:
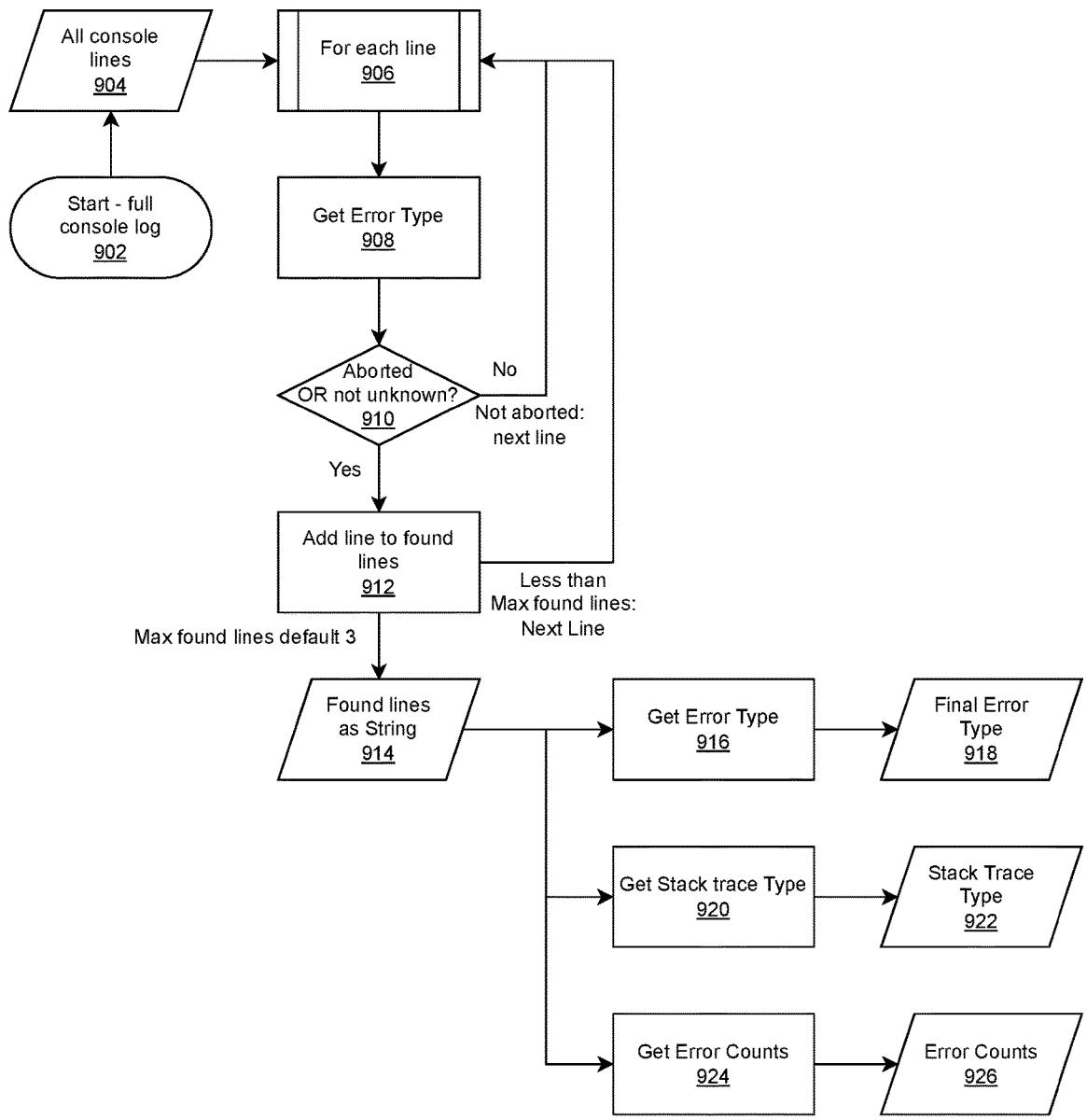
FIG. 9 illustrates an exemplary flow chart of a process of finding final error type, stack trace type, and error counts as implemented by the platform, language, database, and cloud agnostic fake tests detection module of FIG. 4 in accordance with an exemplary embodiment.

FIG. 9 illustrates an exemplary flow chart of a process 900 of finding final error type, stack trace type, and error counts as implemented by the platform, language, database, and cloud agnostic FTDM 406 of FIG. 4 in accordance with an exemplary embodiment. It may be appreciated that the illustrated process 900 and associated steps may be performed in a different order, with illustrated steps omitted, with additional steps added, or with a combination of reordered, combined, omitted, or additional steps.

As illustrated in the process 900 of FIG. 9, at step 902, a full console log is started and outputs all console lines 904. At step 906, a method is called for each line. At step 908, the process 900 gets an error type. At step 910, the process 900 determines whether the error type is aborted or not unknown. At step 912, the process 900 adds line to found lines when it is determined at step 910 that the error type is aborted or not unknown. According to exemplary embodiments, default maximum found lines may be set to 3. Output from step 912 (i.e., less than maximum found lines: nest line) is utilized by the "method call" at step 906 for each line again. When it is determined at step 910 that the error type is not aborted or unknown (i.e., not aborted: next line), the process 900 moves to step 906 again to be utilized by the method call. At step 914, the found lines are generated as a single string. At step 916, the process 900 gets error type and outputs final error type 918. At step 920, the process 900 gets stack trace type and outputs stack trace type 922. At step 924, the process 900 gets error counts and outputs final error counts 926.

Figure 10:
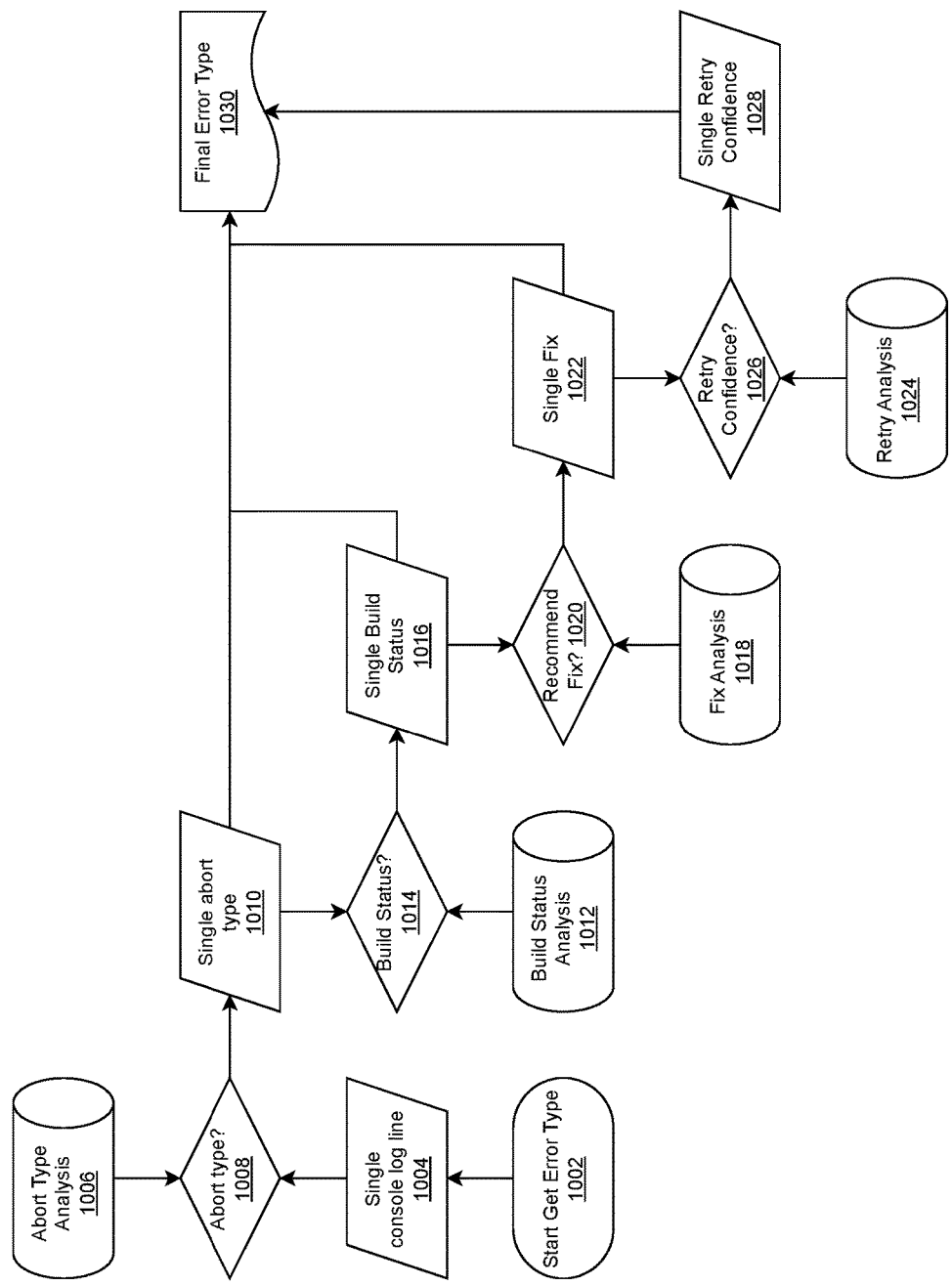
FIG. 10 illustrates another exemplary flow chart of a process of finding final error type as implemented by the platform, language, database, and cloud agnostic fake tests detection module of FIG. 4 in accordance with an exemplary embodiment.

FIG. 10 illustrates another exemplary flow chart of a process 1000 of finding final error type as implemented by the platform, language, database, and cloud agnostic FTDM 406 of FIG. 4 in accordance with an exemplary embodiment. It may be appreciated that the illustrated process 1000 and associated steps may be performed in a different order, with illustrated steps omitted, with additional steps added, or with a combination of reordered, combined, omitted, or additional steps.

As illustrated in FIG. 10, at step 1002, the process 1000 starts a step of getting error type. At step 1004, a single console log line is generated after getting the error type. At step 1008, the process 1000 determines the abort type based on analyzing the single console log line and abort type analysis 1006 received from a database. When it is determined at step 1008 that the abort type is a single abort type 1010, the process 1000 generates a final error type 1030. At step 1014, the process 1000 determines build status based on analyzing build status analysis 1012 received from a database and the single abort type 1010. Step 1014 outputs a single build status 1016 which is utilized to generate the final error type 1030. At step 1020, the process 1000 determines what types of fix is recommended based on analyzing fix analysis 1018 received from a database and the single build status 1016. Step 1020 outputs a single fix 1022 recommendation which is utilized to generate the final error type 1030. At step 1026, the process determines whether to retry confidence based on retry analysis 1024 received from a database and the single fix 1022. Step 1026 outputs a single retry confidence which is utilized to generate the final error type.

Figure 11:
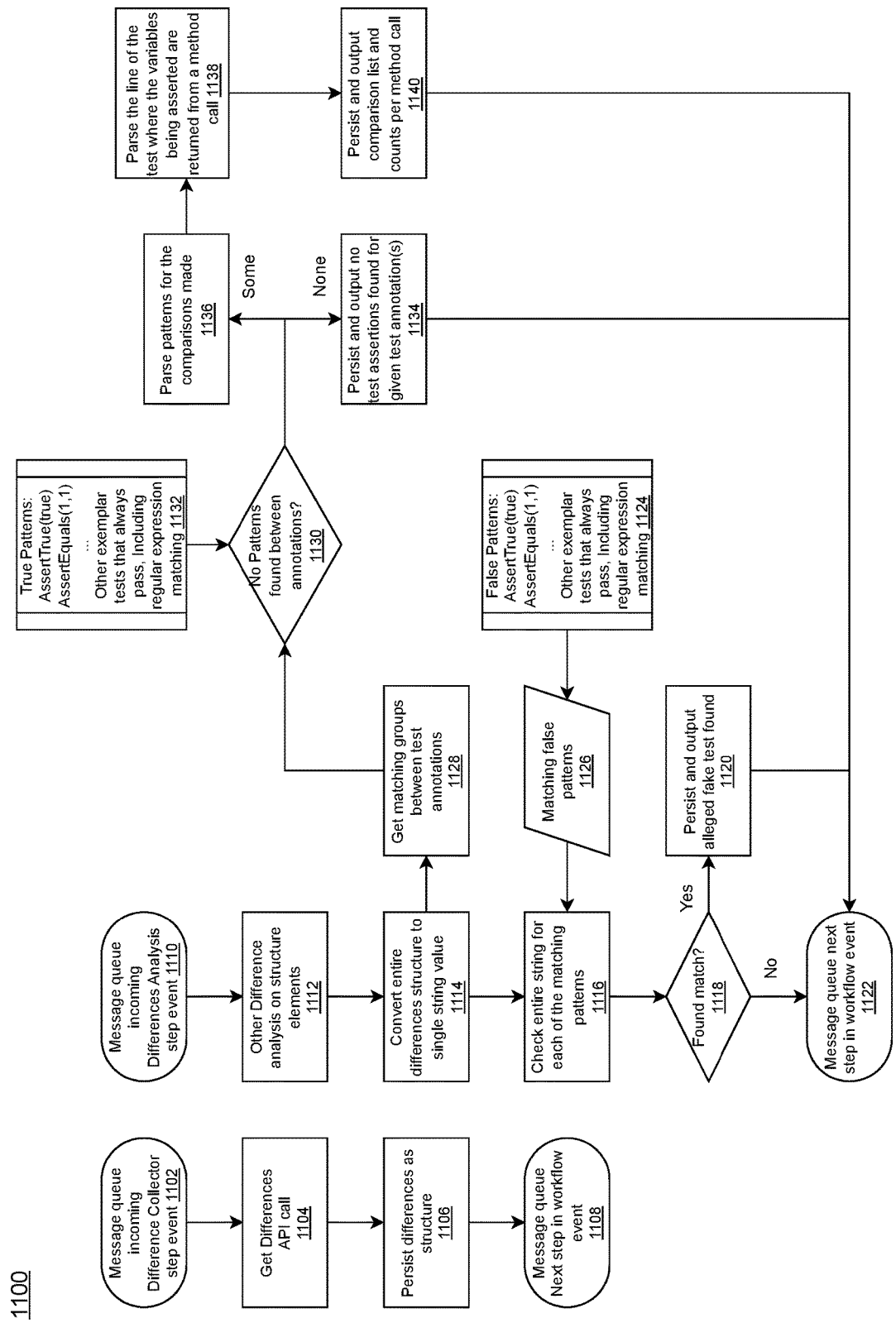
FIG. 11 illustrates another exemplary flow chart of a process of detecting fake tests as implemented by the platform, language, database, and cloud agnostic fake tests detection module of FIG. 4 in accordance with an exemplary embodiment.

FIG. 11 illustrates another exemplary flow chart of a process 1100 of detecting fake tests as implemented by the platform, language, database, and cloud agnostic FTDM 406 of FIG. 4 in accordance with an exemplary embodiment. It may be appreciated that the illustrated process 1100 and associated steps may be performed in a different order, with illustrated steps omitted, with additional steps added, or with a combination of reordered, combined, omitted, or additional steps.

As illustrated in the process 1100 of FIG. 11, according to exemplary embodiments, step 1102 corresponds to messaging queue incoming difference collector step event. At step 1104, a get difference API call is made. In response to the API call, at step 1106, differences are persisted as structure. At step 1108, the process 1100 moves to a message queue next step in a workflow event.

According to exemplary embodiments, step 1110 corresponds to a messaging queue incoming difference analysis step event. Step 1112 corresponds to other difference analysis on structure elements. At step 1114, the entire differences structure is converted into a single string value. At step 1116, the process 1100 checks the entire string for each of the matching patterns. At step 1116, the process 1100 also receives matching false patterns 1126 by calling a method 1124 that may include AssertTrue(true); AssertEquals(1,1); and other exemplar tests that always pass, including regular expression matching. At step 1118, the process 1100 checks whether any match is found. When a match is found, at step 1120, the process 1100 persists and outputs alleged fake test found. When a match is not found, at step 1122, the process 1100 moves to messaging queue next step in the workflow event.

According to exemplary embodiments, at step 1128, the process 1100 gets matching groups between test annotations after converting the entire differences into a single string value at step 1114. At step 1130, the process 1100 determines whether any patterns are found between annotations. At step 1130, the process 1100 also receives matching true patterns by calling a method 1132 that may include AssertTrue(true): AssertEquals(1,1); and other exemplar tests that always pass, including regular expression matching. When no patterns are found between annotations, at step 1134, the process 1100 persists and outputs no test assertions found for given test annotation(s) and moves to the messaging queue next step in the workflow event (step 1122). When some patterns are found between annotations, at step 1136, the process 1100 parses the patterns for the comparisons made, and then at step 1138, the process 1100 parses the line of the test where the variables being asserted are returned from a method call. In response, at step 1140, the process 1100 persists and outputs comparison list and counts per method call and the process 1100 then moves to the messaging queue next step in the workflow event (step 1122).

Figure 12:
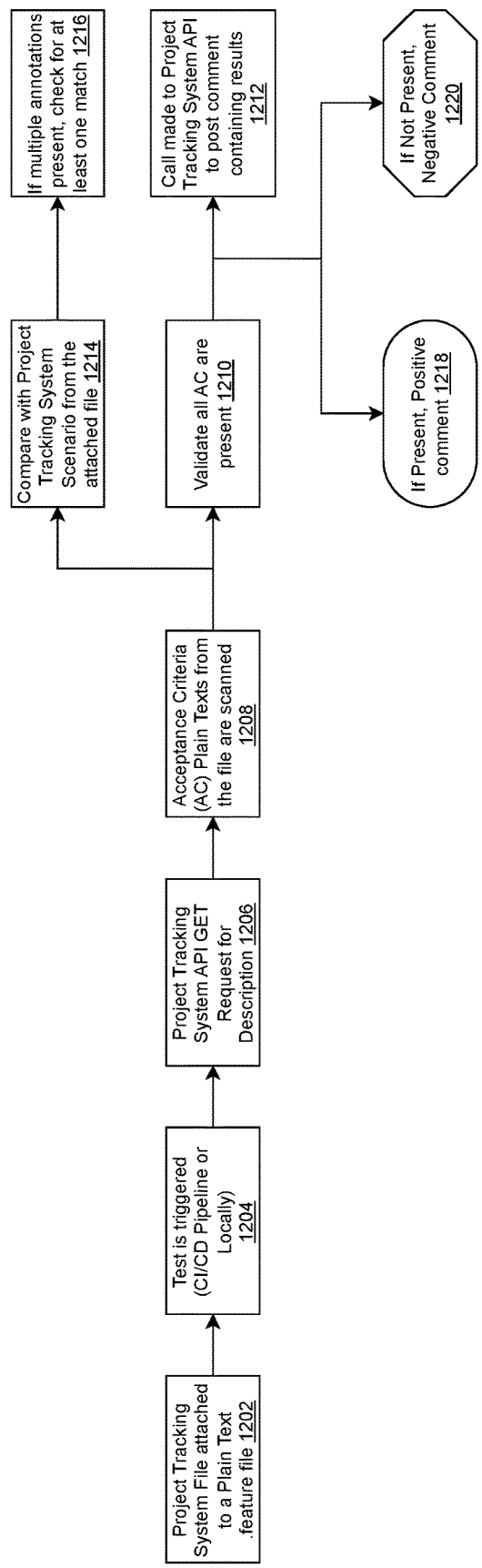
FIG. 12 illustrates an exemplary flow chart of a process of testing codes and outputting comments as implemented by the platform, language, database, and cloud agnostic fake tests detection module of FIG. 4 integrated with a project tracking system in accordance with an exemplary embodiment.

FIG. 12 illustrates an exemplary flow chart of a process 1200 of testing codes and outputting comments as implemented by the platform, language, database, and cloud agnostic FTDM 406 of FIG. 4 integrated with a project tracking system in accordance with an exemplary embodiment. It may be appreciated that the illustrated process 1200 and associated steps may be performed in a different order, with illustrated steps omitted, with additional steps added, or with a combination of reordered, combined, omitted, or additional steps.

According to exemplary embodiments, the process 1200 here is within the code itself a user would annotate with a project tracking system number, i.e., a story that is the backing for whatever code the user is developing. Annotation is made in a feature file that is essentially a plain English scribing functionality utilized for running tests to improve the functionality. Thus, it is a one to one relationship between what the business is expecting and what the user is seeing on the output. According to exemplary embodiments, all those different scribing functionalities are annotated, a test would be triggered, either locally or in the CI/CD pipeline, depending on that pass or fail of that test. The project tracking system number would be included in the report. The process 1200 would then post from those results the pass or fail to the project tracking system itself, via the API for that service, and post those results in a comment there.

For example, according to exemplary embodiments, the process 1200, makes an API get request to the project tracking system and scans the acceptance criteria which is written in plain text as a part of the story construction process. A user may look at that acceptance criteria and may make a test based on acceptance criteria which should be a one to one relationship. The process 1200 may determine that a user didn't test what was explicitly written in the story. Thus, the process 1200 may provide a negative comment stating that "the tests might have passed that you wrote but these tests were not there for the story."

For example, as illustrated in FIG. 12, at step 1202, the process 1200 attaches a project tracking system file to a plain text .feature file. At step 1204, the process 1200 triggers a test either on a CI/CD pipeline or locally. At step 1206, the process 1200 makes a project tracking system API GET request for description. At step 1208, the process 1200 scans acceptance criteria (AC) plain texts from the file. At step 1210, the process 1200 validates that all AC are present. At step 1212, the process 1200 makes a call to the project tracking system API to post comment containing results. At step 1218, the process 1200 displays positive comment when it is determined that all AC are present. At step 1220, the process 1200 displays negative comment when it is determined that all AC are not present.

According to exemplary embodiments, at step 1214, the process 1200 compares with project tracking system scenario from the attached file. At step 1216, the process 1200 checks for at least one match when multiple annotations are present.

Figure 13:
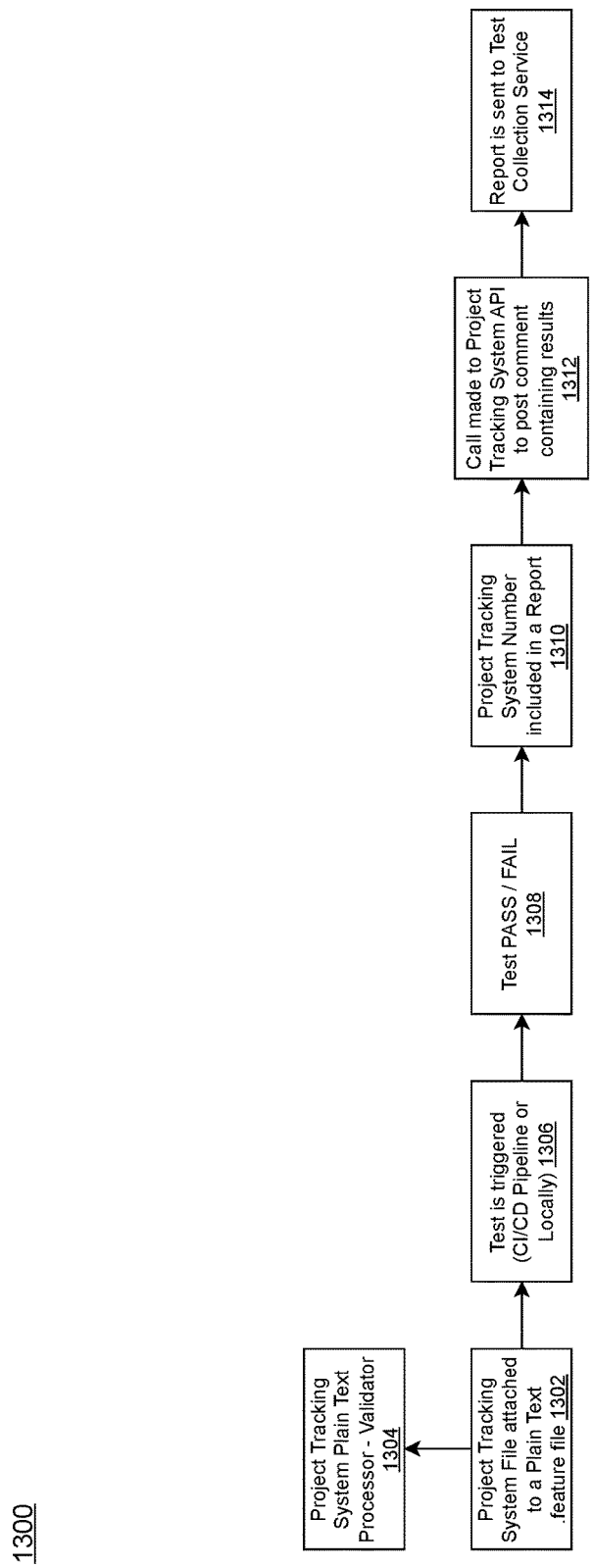
FIG. 13 illustrates another exemplary flow chart of a process of testing codes and reporting to a test collection service as implemented by the platform, language, database, and cloud agnostic fake tests detection module of FIG. 4 integrated with a project tracking system in accordance with an exemplary embodiment.

FIG. 13 illustrates another exemplary flow chart of a process 1300 of testing codes and reporting to a test collection service as implemented by the platform, language, database, and cloud agnostic FTDM 406 of FIG. 4 integrated with a project tracking system in accordance with an exemplary embodiment. It may be appreciated that the illustrated process 1300 and associated steps may be performed in a different order, with illustrated steps omitted, with additional steps added, or with a combination of reordered, combined, omitted, or additional steps.

According to exemplary embodiments, the process 1300 here is within the code itself a user would annotate with a project tracking system number, i.e., a story that is the backing for whatever code the user is developing. Annotation is made in a feature file that is essentially a plain English scribing functionality utilized for running tests to improve the functionality. Thus, it is a one to one relationship between what the business is expecting and what the user is seeing on the output. According to exemplary embodiments, all those different scribing functionalities are annotated, a test would be triggered, either locally or in the CI/CD pipeline, depending on that pass or fail of that test. The project tracking system number would be included in the report. The process 1300 would then post from those results the pass or fail to the project tracking system itself, via the API for that service, and post those results in a comment there. From there, the user can see clearly what path failed or passed and then the report is moved over to a test collection service.

For example, as illustrated in FIG. 13, at step 1302, the process 1300 attaches a project tracking system file to a plain text .feature file and outputs a result to the project tracking system plain text processor (validator) at step 1304. At step 1306, the process 1300 triggers a test either on a CI/CD pipeline or locally. At step 1308, the process 1300 determines whether the test passed or failed. At step 1310, the process 1300 generates a report that include a project tracking system number. At step 1312, the process 1300 makes a call to the project tracking system API to post comment containing results. At step 1314, the process 1300 sends a report containing the results to a test collection service.

Figure 14:
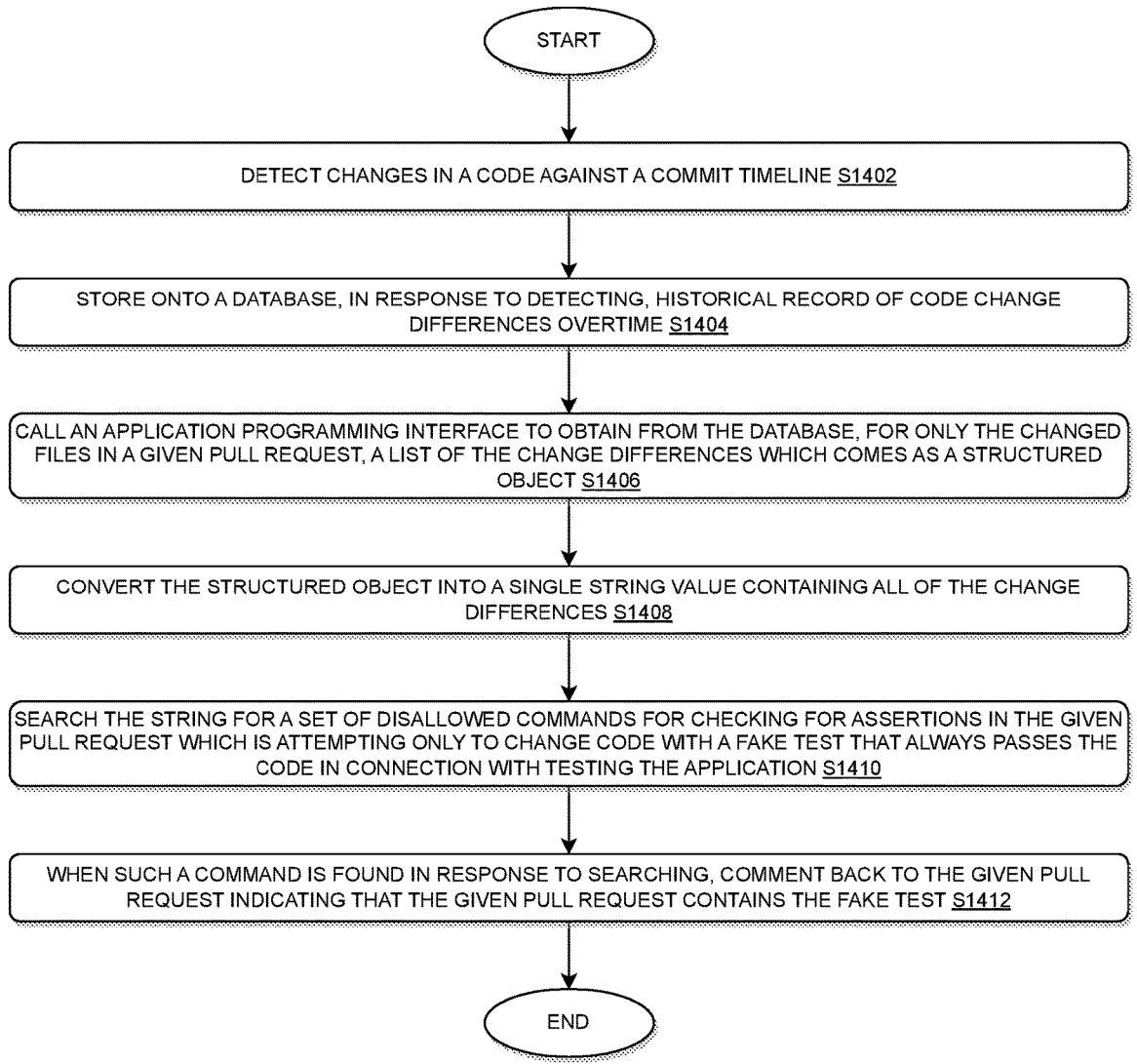
FIG. 14 illustrates an exemplary flow chart of a process implemented by the platform, language, database, and cloud agnostic fake tests detection module of FIG. 4 for automatically detecting software tests that are suspected as tests that always provide false positive in accordance with an exemplary embodiment.

FIG. 14 illustrates an exemplary flow chart of a process 1400 implemented by the platform, language, database, and cloud agnostic FTDM 406 of FIG. 4 for automatically and dynamically capturing digital experiences to support guided training, process and procedures, and job aids in accordance with an exemplary embodiment. It may be appreciated that the illustrated process 1400 and associated steps may be performed in a different order, with illustrated steps omitted, with additional steps added, or with a combination of reordered, combined, omitted, or additional steps.

As illustrated in FIG. 14, at step S1402, the process 1400 may include detecting changes in a code against a commit timeline.

At step S1404, the process 1400 may include storing onto a database, in response to detecting, historical record of code change differences over time. The database stores only corresponding changed files including the changes that occurred between each commit and does not store a full version of the files.

At step S1406, the process 1400 may include calling an application programming interface to obtain from the database, for only the changed files in a given pull request, a list of the change differences which comes as a structured object.

At step S1408, the process 1400 may include converting the structured object into a single string value containing all of the change differences.

At step S1410, the process 1400 may include searching the string for a set of disallowed commands for checking for assertions in the given pull request which is attempting only to change code with a fake test that always passes the code in connection with testing the application.

At step S1412, the process 1400 may include, when such a command is found in response to searching, commenting back to the given pull request indicating that the given pull request contains the fake test.

According to exemplary embodiments, the process 1400 may further include: storing a result containing the fake test and indicating that the given pull request contains false test evidence; and transmitting the result to all approvers who approved the given pull request to implement corresponding remediation action.

According to exemplary embodiments, in searching the string for a set of disallowed commands, the process 1400 may further include: matching false patterns; and checking the entire string for each of the matching false patterns.

According to exemplary embodiments, in the process 1400, the false patterns may include one or more of the following commands: AssertTrue(true) and AssertEquals(1, 1), but the disclosure is not limited thereto.

According to exemplary embodiments, in the process 1400, the false patterns may include tests that always pass, including regular expression matching.

According to exemplary embodiments, after converting the structured object into a single string value containing all of the change differences, the process 1400 may further include: obtaining matching groups between test annotations; and determining whether any true patterns are found between the test annotations.

According to exemplary embodiments, when it is determined that some true patterns are found between the test annotations, the process 1400 may further include: parsing the true patterns for corresponding comparisons that are being made; parsing a line of a test where variables that are being asserted are returned from a method call; and persisting and outputting a comparison list and maintaining counts per method call.

According to exemplary embodiments, when it is determined that no true patterns are found between the test annotations, the process 1400 may further include: persisting and outputting no test assertions found for given test annotations.

According to exemplary embodiments, in the process 1400, the true patterns may include one or more of the following commands: AssertTrue(true) and AssertEquals(1, 1), but the disclosure is not limited thereto.

According to exemplary embodiments, in the process 1400, the true patterns may include tests that always pass, including regular expression matching.

According to exemplary embodiments, the FTDD 402 may include a memory (e.g., a memory 106 as illustrated in FIG. 1) which may be a non-transitory computer readable medium that may be configured to store instructions for implementing a platform, language, database, and cloud agnostic FTDM 406 for detecting fake software tests in connection with an application as disclosed herein. The FTDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the FTDM 406 or within the FTDD 402, may be used to perform one or more of the methods and processes as described herein. In a particular embodiment, the instructions may reside completely, or at least partially, within the memory 106, the medium reader 112, and/or the processor 104 (see FIG. 1) during execution by the FTDD 402.

According to exemplary embodiments, the instructions, when executed, may cause a processor embedded within the FTDM 406 or the FTDD 402 to perform the following: detecting changes in a code against a commit timeline; storing onto a database, in response to detecting, historical record of code change differences over time, wherein the database stores only corresponding changed files including the changes that occurred between each commit and does not store a full version of the files; calling an application programming interface to obtain from the database, for only the changed files in a given pull request, a list of the change differences which comes as a structured object; converting the structured object into a single string value containing all of the change differences; searching the string for a set of disallowed commands for checking for assertions in the given pull request which is attempting only to change code with a fake test that always passes the code in connection with testing the application; and when such a command is found in response to searching, commenting back to the given pull request indicating that the given pull request contains the fake test. According to exemplary embodiments, the processor may be the same or similar to the processor 104 as illustrated in FIG. 1 or the processor embedded within the FTDD 202, FTDD 302, FTDD 402, and FTDM 406 which is the same or similar to the processor 104.

According to exemplary embodiments, the instructions, when executed, may cause the processor 104 to further perform the following: storing a result containing the fake test and indicating that the given pull request contains false test evidence; and transmitting the result to all approvers who approved the given pull request to implement corresponding remediation action.

According to exemplary embodiments, in searching the string for a set of disallowed commands, the instructions, when executed, may cause the processor 104 to further perform the following: matching false patterns; and checking the entire string for each of the matching false patterns.

According to exemplary embodiments, after converting the structured object into a single string value containing all of the change differences, the instructions, when executed, may cause the processor 104 to further perform the following: obtaining matching groups between test annotations; and determining whether any true patterns are found between the test annotations.

According to exemplary embodiments, when it is determined that some true patterns are found between the test annotations, the instructions, when executed, may cause the processor 104 to further perform the following: parsing the true patterns for corresponding comparisons that are being made; parsing a line of a test where variables that are being asserted are returned from a method call; and persisting and outputting a comparison list and maintaining counts per method call.

According to exemplary embodiments, when it is determined that no true patterns are found between the test annotations, the instructions, when executed, may cause the processor 104 to further perform the following: persisting and outputting no test assertions found for given test annotations.

According to exemplary embodiments as disclosed above in FIGS. 1-14, technical improvements effected by the instant disclosure may include a platform for implementing a platform, language, database, and cloud agnostic fake tests detection module configured to automatically and dynamically detect software tests that are suspected as tests (may also be referred to as fake tests) that will always provide false positive and check for assertions in a pull request which is attempting only to change code with a new fake test, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for detecting fake software tests in a testing environment in connection with an application prior to submitting the application in a production environment by utilizing one or more processors along with allocated memory, the method comprising:
    implementing a platform, language, cloud, and database agnostic fake tests detection module (FTDM), by a language, platform, database, and cloud agnostic fake tests detection device (FTDD), wherein the one or more processors are embedded within the FTDD, wherein the FTDM is configured to detect a software test that is suspected as a fake test that always provide false positive and check for assertions in a pull request which is attempting only to change code with a new fake test, wherein the FTDM includes a detecting module, a storing module, a calling module, a converting module, and a searching module, and wherein each module being called via corresponding application programming interface (API);
    detecting changes in a code against a commit timeline by calling the detecting module;
    storing onto a database, in response to detecting, historical record of code change differences over time by calling the storing module, wherein the database stores only corresponding changed files including the changes that occurred between each commit and does not store a full version of the files;
    calling the calling module to obtain from the database, for only the changed files in a given pull request, a list of the change differences which comes as a structured object;
    converting the structured object into a single string value containing all of the change differences by calling the converting module;
    searching, by calling the searching module, the single string value for a set of disallowed commands for checking for assertions in the given pull request which is attempting only to change code with the fake test that always passes the code in connection with testing the application;
    when such a command is found in response to searching, transmitting a comment back to the given pull request indicating that the given pull request contains the fake test; and
    updating the given pull request by removing the detected fake test from the testing environment in response to the comment and revising the code for subsequent testing, thereby increasing processing speed of the one or more processors in testing the code again in the testing environment and increasing production speed of the application in the production environment.

2. The method according to claim 1, further comprising:
    storing a result containing the fake test and indicating that the given pull request contains false test evidence; and
    transmitting the result to all approvers who approved the given pull request to implement corresponding remediation action.

3. The method according to claim 1, wherein in searching the single string value for a set of disallowed commands, the method further comprising:
    matching false patterns; and
    checking the entire single string value for each of the matching false patterns.

4. The method according to claim 3, wherein the false patterns include one or more of the following commands: AssertTrue(true) and AssertEquals(1,1).

5. The method according to claim 3, wherein the false patterns include tests that always pass, including regular expression matching.

6. The method according to claim 1, wherein after converting the structured object into a single string value containing all of the change differences, the method further comprising:
    obtaining matching groups between test annotations; and
    determining whether any true patterns are found between the test annotations.

7. The method according to claim 6, when it is determined that some true patterns are found between the test annotations, the method further comprising:
    parsing the true patterns for corresponding comparisons that are being made;
    parsing a line of a test where variables that are being asserted are returned from a method call; and
    persisting and outputting a comparison list and maintaining counts per method call.

8. The method according to claim 6, when it is determined that no true patterns are found between the test annotations, the method further comprising:
    persisting and outputting no test assertions found for given test annotations.

9. The method according to claim 6, wherein the true patterns include one or more of the following commands: AssertTrue(true) and AssertEquals(1,1).

10. The method according to claim 6, wherein the true patterns include tests that always pass, including regular expression matching.

11. A system for detecting fake software tests in a testing environment in connection with an application prior to submitting the application in a production environment, the system comprising:
- a processor; and
- a memory operatively connected to the processor via a communication interface, the memory storing computer readable instructions, when executed, causes the processor to:
- implement a platform, language, cloud, and database agnostic fake tests detection module (FTDM), by a language, platform, database, and cloud agnostic fake tests detection device (FTDD), wherein the one or more processors are embedded within the FTDD, wherein the FTDM is configured to detect a software test that is suspected as a fake test that always provide false positive and check for assertions in a pull request which is attempting only to change code with a new fake test, wherein the FTDM includes a detecting module, a storing module, a calling module, a converting module, and a searching module, and wherein each module being called via corresponding application programming interface (API):
- detect changes in a code against a commit timeline by calling the detecting module;
- store onto a database, in response to detecting, historical record of code change differences over time by calling the storing module, wherein the database stores only corresponding changed files including the changes that occurred between each commit and does not store a full version of the files;
- call the calling module to obtain from the database, for only the changed files in a given pull request, a list of the change differences which comes as a structured object;
- convert the structured object into a single string value containing all of the change differences by calling the converting module;
- search, by calling the searching module, the single string value for a set of disallowed commands for checking for assertions in the given pull request which is attempting only to change code with the fake test that always passes the code in connection with testing the application;
- when such a command is found in response to searching, transmit a comment back to the given pull request indicating that the given pull request contains the fake test; and
- update the given pull request by removing the detected fake test from the testing environment in response to the comment and revise the code for subsequent testing, thereby increasing processing speed of the processor in testing the code again in the testing environment and increasing production speed of the application in the production environment.

12. The system according to claim 11, wherein the processor is further configured to:
- store a result containing the fake test and indicating that the given pull request contains false test evidence; and
- transmit the result to all approvers who approved the given pull request to implement corresponding remediation action.

13. The system according to claim 11, wherein in searching the single string value for a set of disallowed commands, the processor is further configured to:
- match false patterns; and
- check the entire single string value for each of the matching false patterns.

14. The system according to claim 13, wherein the false patterns include one or more of the following commands: AssertTrue(true) and AssertEquals(1,1).

15. The system according to claim 13, wherein the false patterns include tests that always pass, including regular expression matching.

16. The system according to claim 11, wherein after converting the structured object into a single string value containing all of the change differences, the processor is further configured to:
- obtain matching groups between test annotations; and
- determine whether any true patterns are found between the test annotations.

17. The system according to claim 16, when it is determined that some true patterns are found between the test annotations, the processor is further configured to:
- parse the true patterns for corresponding comparisons that are being made;
- parse a line of a test where variables that are being asserted are returned from a system call; and
- persist and output a comparison list and maintain counts per system call.

18. The system according to claim 16, when it is determined that no true patterns are found between the test annotations, the processor is further configured to:
- persist and output no test assertions found for given test annotations.

19. The system according to claim 16, wherein the true patterns include one or more of the following commands: AssertTrue(true) and AssertEquals(1,1), and wherein the true patterns include tests that always pass, including regular expression matching.

20. A non-transitory computer readable medium configured to store instructions for detecting fake software tests in a testing environment in connection with an application prior to submitting the application in a production environment, the instructions, when executed, cause a processor to perform the following:
- implementing a platform, language, cloud, and database agnostic fake tests detection module (FTDM), by a language, platform, database, and cloud agnostic fake tests detection device (FTDD), wherein the one or more processors are embedded within the FTDD, wherein the FTDM is configured to detect a software test that is suspected as a fake test that always provide false positive and check for assertions in a pull request which is attempting only to change code with a new fake test, wherein the FTDM includes a detecting module, a storing module, a calling module, a converting module, and a searching module, and wherein each module being called via corresponding application programming interface (API);
- detecting changes in a code against a commit timeline by calling the detecting module;
- storing onto a database, in response to detecting, historical record of code change differences over time by calling the storing module, wherein the database stores only corresponding changed files including the changes that occurred between each commit and does not store a full version of the files;

calling the calling module to obtain from the database, for only the changed files in a given pull request, a list of the change differences which comes as a structured object;

converting the structured object into a single string value containing all of the change differences by calling the converting module;

searching, by calling the searching module, the single string value for a set of disallowed commands for checking for assertions in the given pull request which is attempting only to change code with the fake test that always passes the code in connection with testing the application;

when such a command is found in response to searching, transmitting a comment back to the given pull request indicating that the given pull request contains the fake test; and updating the given pull request by removing the detected fake test from the testing environment in response to the comment and revising the code for subsequent testing, thereby increasing processing speed of the one or more processors in testing the code again in the testing environment and increasing production speed of the application in the production environment.

\* \* \* \* \*